United States Patent [19]

Gilbert et al.

[11] Patent Number: 4,922,304

[45] Date of Patent: May 1, 1990

[54] REPRODUCTION MACHINE FUSER BELT

[75] Inventors: Laura M. Gilbert, Vestal; David Vermaat, Port Crane, both of N.Y.

[73] Assignee: Imagitek, Binghamton, N.Y.

[21] Appl. No.: 167,037

[22] Filed: Mar. 11, 1988

[51] Int. Cl.[5] .............................................. B65G 15/42

[52] U.S. Cl. .................................... 355/282; 198/620; 198/844; 198/952; 198/811

[58] Field of Search ............... 355/290, 295, 285, 212, 355/282; 219/216; 271/272, 34, 35, 198, 275; 198/620, 624, 626, 699.1, 690.2, 844, 952, 811

[56] References Cited

U.S. PATENT DOCUMENTS

| | | | |
|---|---|---|---|
| 4,056,706 | 11/1977 | Strella | 219/216 |
| 4,565,439 | 1/1986 | Reynolds | 219/216 X |
| 4,582,416 | 4/1986 | Karz et al. | 219/216 X |
| 4,611,902 | 9/1986 | Schon | 355/285 |
| 4,682,878 | 7/1987 | Takizawa et al. | 355/282 |

FOREIGN PATENT DOCUMENTS

| | | | |
|---|---|---|---|
| 1194320 | 6/1965 | Fed. Rep. of Germany | 198/699.1 |
| 0066584 | 3/1988 | Japan | 355/290 |

*Primary Examiner*—Robert J. Spar

*Assistant Examiner*—Lyle Kimms

*Attorney, Agent, or Firm*—Kane, Dalsimer, Sullivan, Kurucz, Levy, Eisele and Richard

[57] ABSTRACT

A fuser belt for a reproduction machine is disclosed. The belt may have one of several configurations which all include ridges and interstices on the outer surface which contacts the print media. These interstices are formed between regularly spaced ridges, between randomly spaced particles, between knit threads. These interstices allow the free escape of steam from the media during high-temperature fusing of the reproduction process. As the steam escapes freely, the steam does not accumulate in the media causing media deformations and copy quality deterioration. Additionally, media handling is improved because the ridges and interstices reduce the unwanted but unavoidable introduction of thermal energy into the copy media.

6 Claims, 3 Drawing Sheets

REPRODUCTION MACHINE FUSER BELT

BACKGROUND OF THE INVENTION

The present relates to a reproduction machines and in particular to fuser belts for use in photocopy and related printing art equipment.

In the photocopy and related printing arts, systems must be designed to transport the media upon which an image is printed. These transport systems must reliably maintain the geometric stability of the media throughout the photocopy or printing process. This becomes increasingly difficult when the media sheets are in a wider format, such as in engineering copy applications. Further, it is more difficult to maintain the geometric stability of the media as the throughput rate increases and the fusing temperature increases. Under such conditions, in particular, it is difficult to keep media with a high moisture content, such as paper, from wrinkling and puckering during the fusing or heating process.

These media deformations occur when water vapor is expelled from the media during the high-temperature fusing process. A portion of the water within the media is turned to steam during the fusing process. Some of this steam is trapped within the media thereby forming gas pockets between the fuser belt and the heated roller. The gas pockets are randomly located and adversely affect the transfer of thermal energy away from the media. Cooler regions of the media become depositories for water vapor expelled from the hotter regions of the media. These temperature and moisture gradients cause deformation of the media, such as puckers and wrinkles. Further, these gradients and resultant deformations may cause regions of poor image fusing and image deterioration.

Copy media based on plastics, such as drafting film, deform and transport poorly if too much thermal energy is transferred into the media during the fusing process because the higher temperatures cause the material to soften and lose its strength. If the beam strength of the media is lowered too much before it exits the fuse, the media will usually buckle and cool in an objectionable non planar form.

The prior art has dealt with these concerns by using expensive precision-made fuser belts and controlled transport geometry. Additionally, the prior art uses belt fusers with high nip pressures generated by smooth-surfaced belts operating under high tension so as to press the media tightly against the heated roller. The resulting pressure eliminates the tendency of gas pockets to form in the media as the media is pressed between the fuser belt and the heated roller. The high tension in the fuser belt requires that the fuser belt drive mechanism use rollers having very high bending movements which in turn requires that the rollers be large, heavy and expensive to manufacture and to operate.

Prior art fuser belts have smooth surfaces which have high area of contact against the heated roller. This contact allows thermal energy to be transferred to the fuser belt and the rollers upon which the belt is located. This transfer of thermal energy is undesirable because it causes the warm-up time of the fuser to be long.

The thermal energy stored in the belt and the belt support rollers will eventually be transported into the side of the media opposite from the heated roller. This extra thermal energy introduced into the media adversely affects its paper handling performance. When the media is paper, wrinkle and pucker may occur. When the media is vellum, stalling may occur. When the media is film, softening is excessive. The film loses its internal strength causing puckers, wrinkles and image deformation. Prior art fuser systems require the use of the expensive thick film media.

In view of the above, it is the principal object of the present invention to provide a fuser belt for reproduction machines which allows water vapor to escape from the media during the fusing process without deforming the media.

It is a further object of this invention to provide a fuser belt which can be operated with a low belt tension thereby avoiding the need for high roller bending moments. This, in turn, allows the use of small, lightweight rollers of low thermal mass.

It is a further object of this invention to provide a fuser belt which removes thermal energy from the heated roller at a rate substantially reduced over that of the prior art thereby reducing the deformation of media such as film and to improve media handling and transport.

Still another object is to provide a fuser belt which can be incorporated into conventional reproduction machines with none or little retrofitting.

Summary of the Invention

The above and other beneficial objects and advantages are attained in accordance with the present invention by providing a fuser belt formed of extruded silicone rubber or a similar thermally stable material with an exterior surface of serrated transverse ridges and interstices. The surface of the belt has ridges, which have a spatial frequency of four to fifty occurrences per centimeter, and a height of 0.15 mm to 1.5 mm, and interstices which allow steam to escape freely from the media during the heating or fusing process. This free escape of steam obviates the need for high belt tension and the aforementioned expensive transport system components. The ridges and interstices are constructed so as to minimize the contact area of the belt with the heated roller when media is not present. Similarly, belt contact with the backside of the media is also minimized when media is present while the important function of pressing the media to the hot roll is preserved.

In an alternative embodiment of the present invention, a fuser belt formed of extruded silicone rubber or a similar thermally stable material with an exterior and interior surface of serrated transverse ridges and interstices. The surfaces of the belt have ridges which have a spatial frequency of our to fifty occurrences per centimeter, and a height of 0.15 mm to 1.5 mm, and interstices which allow steam to escape freely from the media during the heating or fusing process and minimize the area of contact with the heated surface. This free escape of steam obviates the need for high belt tension and the aforementioned expensive transport system components.

These interior ridges further minimize the thermal energy transfer from the heated roller to the belt and belt rollers which store heat and further increase the temperature and moisture gradients which cause deformation of the media.

In an alternative embodiment of the present invention a fuser belt made of silicone rubber or similar material is provided with a rough exterior surface of random texture contacting the media. This surface is formed by the random depositing and subsequent bonding of ground silicone rubber or other thermally stable particles with a size range of 0.05 mm to 1.5 mm and a particle density of approximately 2000 per square centimeter of fuser belt surface area.

Those skilled in the art will realize that a functionally equivalent surface may be generated by other means. The interstices between the random particles allow steam to escape freely during the heating or fusing process and minimize the area of contact with the heated surface. This free escape of steam obviates the need for high belt tension and the aforementioned expensive transport system components. The interstices between the random particles minimize the area of contact with the heated surface. As described above, this reduced thermal energy transfer reduces the temperature and moisture gradients which cause deformation of the media.

In a further alternative embodiment of this invention a fuser belt comprised of an woven or knit fabric is provided. The regular pattern surface texture configuration of the belt allows steam to escape freely during the heating or fusing process. As described above, this free escape of steam obviates the need for high belt tension and the aforementioned expensive transport system components. The regular pattern texture of the exterior and interior surfaces of the belt allow for the minimization of the heat transfer to the belt and belt rollers. As described above, this reduced thermal energy transfer reduces the temperature and moisture gradients which cause deformation of the media.

Detailed Description of the Preferred Embodiments

Figure 1:
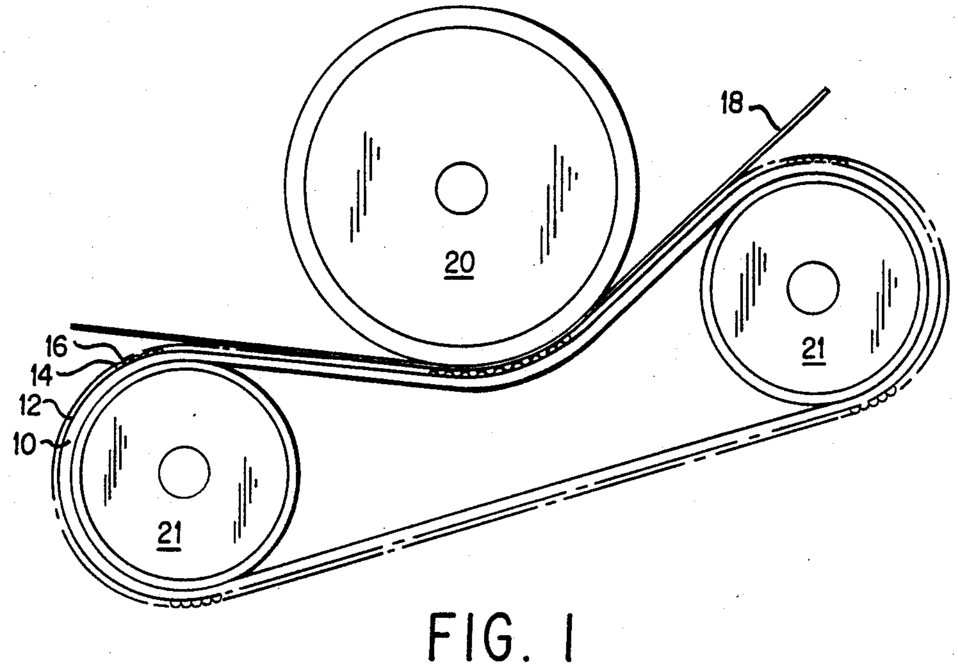
FIG. 1 is a side view of a fuser belt in accordance with a preferred embodiment of the present invention in a typical application environment.

Reference is now made to the drawings and to FIG. 1 in particular wherein a section of a reproduction machine is depicted including a fuser drum 20 and fuser belt 10. The exterior surface 12 of fuser belt 10 has transverse ridges 14 with interstices 16 therebetween. Exterior surfaces 12, with its ridges 14 contact the media (such as paper) 18 in which the copy to be reproduced is formed and hold it firmly against heated roller 20. Interstices 16 do not contact the media. Rollers 21 serve to drive the fuser belt 10 in a conventional manner. While FIG. 1 discloses the fuser belt having the surface detail of the preferred embodiment, it must be realized that essentially the same configuration is used for all embodiments of the fuser belt of this invention.

Figure 2:
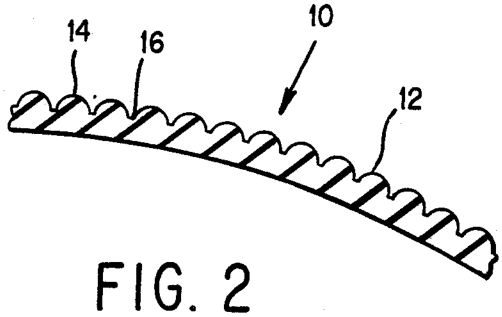
FIG. 2 is a cross-sectional view of a fuser belt of the preferred embodiment.

FIG. 2 discloses the fuser belt 10 of the preferred embodiment in more detail. The fuser belt 10 has transverse ridges 14 of a semicircular cross-section. The diameter of the cross-section is ideally 1.2 millimeters, but may range from 0.3 millimeters to 3.0 millimeters. The spatial frequency of these ridges is ideally 8.33 per centimeter. Alternatively, the frequency of these ridges may also range from 4–50 per centimeter. Within a given fuser belt 10, the diameters should be constant. Interstices 16 are between ridges 14 and run parallel thereto.

During the copying process the media is brought against the fuser drum and heated thereby. The pattern of interstices 16 and ridges 14 of the present fuser belt 10 allows steam to escape freely from the media 18 as it contacts heated drum 20. As the steam escapes freely, it does not build up against the media causing subsequent media deformations and possible image deterioration.

The pattern of the interstices 16 and ridges 14 reduce the area of contact with the heated roller 20 thereby reducing the thermal energy transfer to the fuser belt 10 and the belt rollers 21. The reduced thermal energy transfer to the belt and belt rollers reduces the thermal energy storage which further reduces the temperature and moisture gradients which cause deformation of the media.

Figure 3:
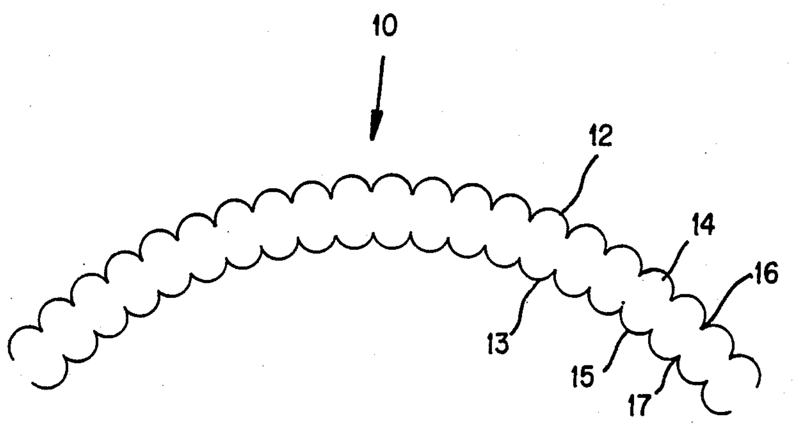
FIG. 3 is a cross-sectional view of a fuser belt of an alternative embodiment using an interior texture.

FIG. 3 discloses the interior and exterior surfaces of an alternative embodiment of fuser belt 10. The fuser belt 10 has transverse ridges 14 and 15 of a semicircular cross-section on the exterior surface 12 and interior surface 13. The diameter of the cross-section of each ridge is ideally 1.2 millimeters, but may range from 0.3 millimeters to 3.0 millimeters. The spatial frequency of these ridges is ideally 8.33 per centimeter. Alternatively, the frequency of these ridges may also range from 4–50 per centimeter. Within a given fuser belt 10, the diameters should be constant. Interstices 16 are between ridges 14 and run parallel thereto. Interstices 17 are between ridges 15 and run parallel thereto.

During the copying process the media is brought against the fuser drum and heated thereby. The pattern of interstices 16 and ridges 14 of the present fuser belt 10 allows steam to escape freely from the media 18 as it contacts heated drum 20. As the steam escapes freely, it does not build up against the media causing subsequent media deformations and possible image deterioration.

The pattern of the interstices 16 and ridges 14 reduce the area of contact with the heated roller 20 thereby reducing the thermal energy transfer to the fuser belt 10. The pattern of the interstices 17 and ridges 15 reduce the area of contact between the fuser belt 10 and the belt rollers 21. The further reduced thermal energy transfer to the belt and belt rollers reduces the thermal energy storage which further reduces the temperature and moisture gradients which cause deformation of the media.

Figure 4:
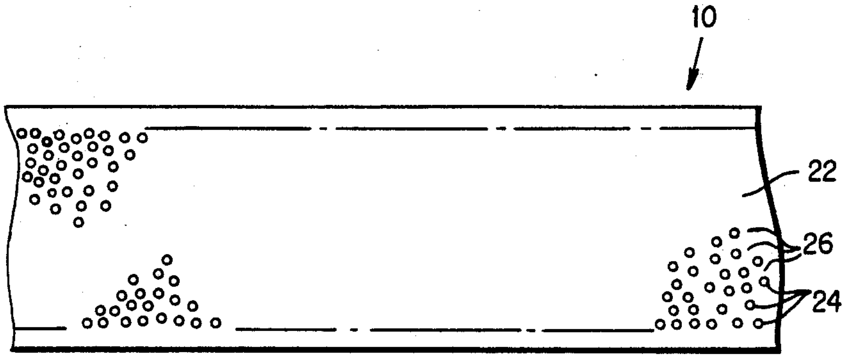
FIG. 4 is a view in perspective of the surface of the fuser belt of an alternative embodiment using a random surface texture.

FIG. 4 discloses the surface 22 of an alternative embodiment of fuser belt 10. This surface 22 is formed by the random depositing and bonding of ground silicone rubber particles 24 with a size range of 0.05 to 1.5 millimeters and a particle density of approximately 2000 per square centimeter of surface 22 of fuser belt 10. Once again, the interstices 26 between particles 24 allow steam to escape freely from media 18 as it contacts heated drum 20 and they reduce the thermal energy transfer that can cause temperature and moisture gradients in the media that result in the deformation of the media.

Figure 5:
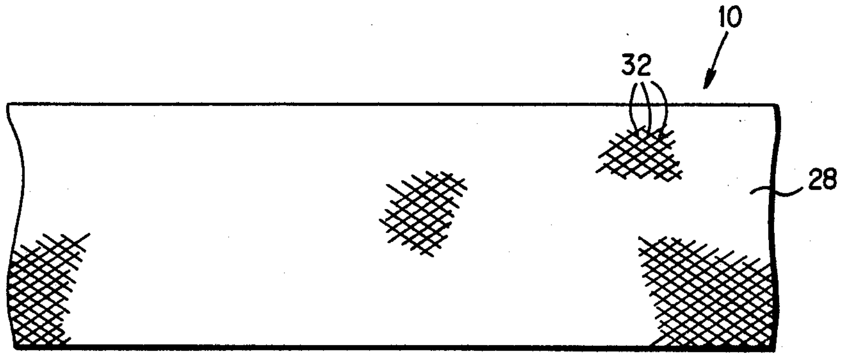
FIG. 5 is a view in perspective of the surface of the fuser belt of a second alternative embodiment using a regular pattern surface texture woven material; and, FIG. 6 is a view in perspective similar to FIG. 5 but depicting a regular pattern surface texture knit material.
Figure 6:
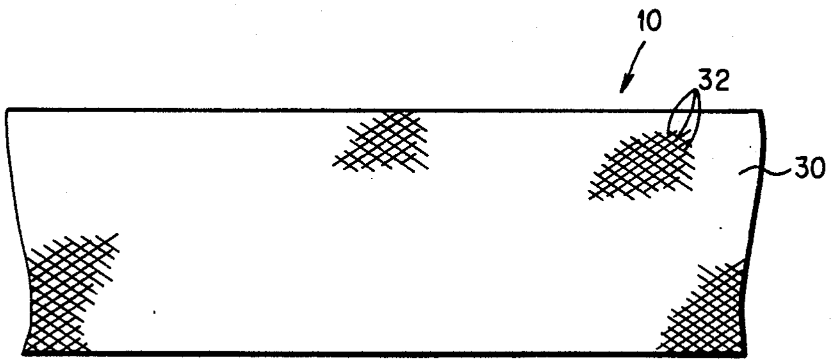

FIGS. 5 and 6 disclose a woven surface 28 and a knit surface 30, respectively, of two further alternative embodiments of fuser belt 10. The knit or woven pattern is of a regular pattern surface texture so as to create interstices 32. These interstices 32 are functionally equivalent to the interstices 16 and 26 of the other embodiments in that they allow steam to escape freely from medium 18 as it contacts heated drum 20 and thereby prevent a pressure build up which could otherwise result in deterioration of the media and/or image thereon, and that they reduce the thermal energy transfer that can cause temperature and moisture gradients in the media that result in deformation of the media.

Although the above describes the preferred embodiment, it is obvious to those skilled in the art that obvious modification into other configurations still utilize the basic teachings of this invention. For example, the ribs and interstices need not run along the length of belt. They may instead run circumferentially, such belts being made, for example, by molding.

It is also clear that selected overcoatings may be applied to irregular or regular woven or knitted belts to control friction, static charge build-up, provide ease in maintaining cleanliness, or control fiber breakage or end fraying while maintaining the required low surface contact area and escape paths for steam.

Thus, in accordance with the above, the aforementioned objects are effectively attained.

Having thus described the invention, what is claimed is:

1. In a fixing device of the type comprising a fixing roller heated by heating means, and a fuser belt for fixing a toner image formed on a copying medium while the same is being clamped between said heated fixing roller and said fuser belt and conveyed in contact with said heated fixing roller and said fuser belt, the improvement wherein:

said fuser belt comprising an inner and outer surface, said outer surface having a mechanical texture thereon comprising ridges and interstices perpendicular to the direction of travel of the fuser belt thereby allowing steam to escape freely from media.

2. The fuser belt of claim 1 wherein said ridges are substantially semicircular in cross section.

3. The fuser belt of claim 2 wherein a diameter of said substantially semicircular cross section is between 0.30 mm to 3.0 mm.

4. The fuser belt of claim 2 wherein said ridges occur at a frequency of between 4 to 50 times per centimeter as measured along said direction of travel.

5. The fuser belt of claim 1 of said ridge have a height of between 0.15 mm to 1.5 mm.

6. The fuser belt of claim 5 wherein said ridges occur at a frequency of between 4 to 50 times per centimeter as measured along said direction of travel.

* * * * *